J. L. THOMPSON.
HORSE COLLAR.
APPLICATION FILED MAY 31, 1916.
1,196,994.
Patented Sept. 5, 1916.
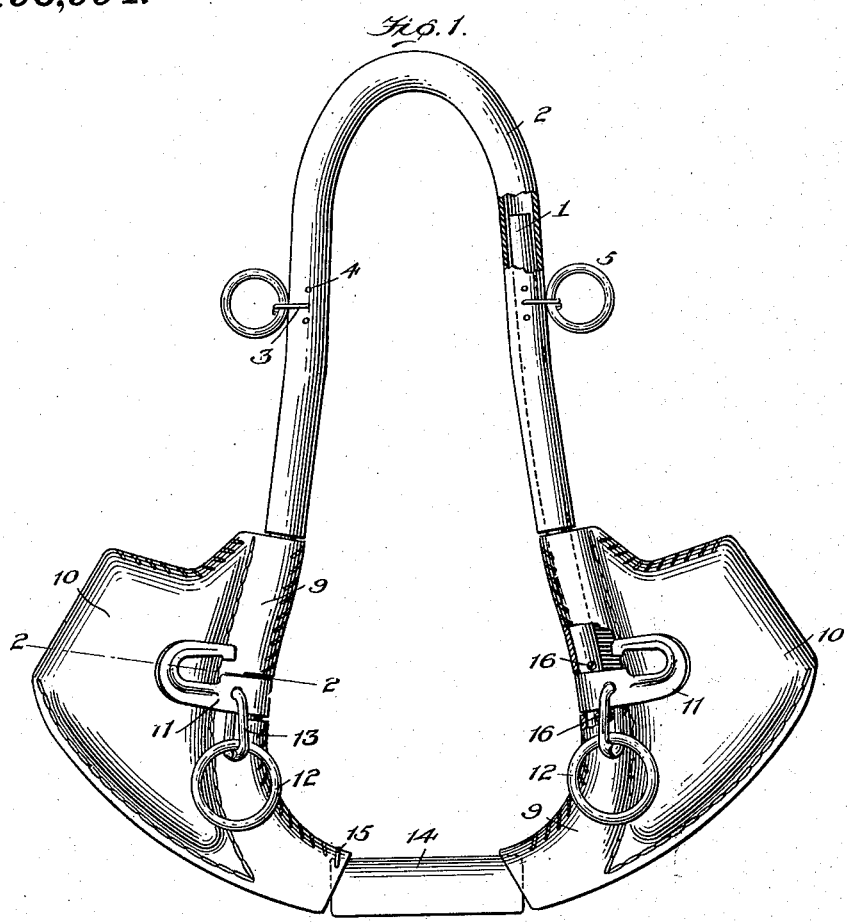
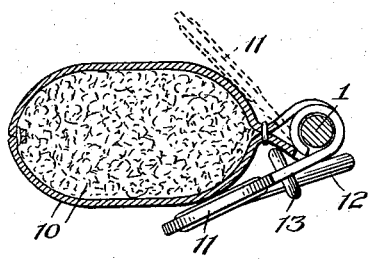
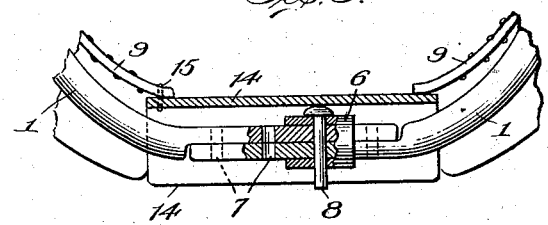
Witness
Edwin L. Bradford
Inventor
J. L. Thompson
By Greene & Greene
Attorneys

UNITED STATES PATENT OFFICE.

JOHN L. THOMPSON, OF NEW ORLEANS, LOUISIANA.

HORSE-COLLAR.

1,196,994.  Specification of Letters Patent.  Patented Sept. 5, 1916.

Application filed May 31, 1916. Serial No. 100,891.

*To all whom it may concern:*

Be it known that I, JOHN L. THOMPSON, a citizen of the United States, and resident of New Orleans, in the parish of Orleans and State of Louisiana, have invented certain new and useful Improvements in Horse-Collars, of which the following is a specification, reference being had therein to the accompanying drawing.

The invention relates to collars for draft horses, and its object is to provide an inexpensive collar that is very simple, convenient, and satisfactory in use.

The collar is reversible, adjustable in length and width, and consists of metal frame members connected above by a yielding supporting member to rest upon the neck of the animal, and with relatively small pads, in the line of the traces, upon which the shoulders of the horse exert the usual load pulling force.

In the accompanying drawings, Figure 1 shows the collar in front elevation. Fig. 2 is a section on the line 2—2, Fig. 1. Fig. 3 is a front view, the lower portion of the collar partly being broken away.

In these drawings the collar frame is shown as made up of two more or less hames-like metal bars 1, shown in this instance as solid, over the upper ends of which is slipped a flexible hose-like connecting member 2 of U-shape to rest upon the neck of a horse and thus support, or aid in supporting, the collar. The member 2 is secured to the metal rods by wires 3, or the like, passing through it and through the inclosed portions of the members 1, the inclosed or inclosing member, or both, being provided with a series of holes 4 so that the collar may be lengthened or shortened by varying the telescoping of the members. To the wires 3 or other analogous wires guide rings 5 are attached. The lower end portions of the members 1 are nearly horizontal and are overlapped and adjustably connected, as shown for illustration by halving the overlapping portions, inclosing them in a loose sleeve 6, and passing through the sleeve and one of several sets of perforations 7 in both halves a headed pin 8. Over the lower central portions of the members 1 are slipped sleeves 9 of heavy leather which cover the lower approximately vertical portions of the members 1 and are each extended outward and stuffed to form pads 10 to rest against the shoulders of the horse. Each sleeve 9 is cut away opposite the middle of its pad to receive a trace hook 11, one end of which encircles the corresponding portion of the member 1 between removable pins 16 in the member 1 on which the hook swings freely. From each hook a ring 12 is suspended by a link 13. The overlapping portions of the members 1 are protected by a U-shaped member 14, preferably of heavy leather, which is hinged at 15 to the lower end of one sleeve 9 and has its opposite end removably engaged under the corresponding end of the companion sleeve.

The collar is reversible, the hooks being swung about the members 1 to rest against either face of the pads, as desired. It is obvious from the construction that the length of the collar may be varied at will and that the width of the lower part may be adjusted to suit different animals. The collar costs but a fraction of the cost of an ordinary collar, and any part may be replaced without disturbing other parts. Practical use shows that the pads serve perfectly for protecting the shoulders of the horse, there being apparently no need for the extended pads usually employed, since in any case the draft pressure upon the animal is almost exclusively on the parts of the shoulder protected by these pads.

What I claim is:

1. The combination with an upwardly open U-shaped frame made up of two rigid rod members inwardly curved and detachably connected below, of sleeves of pliable material loosely inclosing the lower portions of said members, respectively, and each extended outwardly to form a pad, trace-engaging members slidingly secured to said rod members, respectively and located opposite the central portions of the corresponding pads, and a vertically adjustable member of inverted U-shape connecting the upper portions of said rod members.

2. The combination with an upwardly open U-shaped collar frame of rigid material, of a yielding, pliable tubular member of inverted U-shape telescoping and connecting the upper ends of said frame, draft-receiving pads mounted upon the branches of said frame respectively and adapted to slide thereon to and from working position, and trace engaging members revolubly mounted upon the branches of the frame, respectively, opposite the middle portions of the corresponding pads.

3. The combination with an upwardly open U-shaped metal frame made up of two metal members adjustably overlapped at the lower side of the frame, flexible sleeves passed over the lower portions of said members, respectively, and each carrying an outwardly extending pad, trace engaging hooks mounted on said members to swing against said pads, and a pliable tube adjustably connecting the upper ends of said members.

4. The combination with a suitable frame structure, of outwardly extending pads secured, respectively, to the opposite sides of the lower portion of said structure, and trace engaging hooks mounted, respectively, on each side of said structure to swing against either face of the corresponding pad, whereby the collar is reversible.

5. The combination with an upwardly open U-shaped metal frame made up of two members overlapping at the bottom of the U and having a series of holes through the overlapped portions, a sleeve encircling the overlapped portions, a pin passed through said sleeve and overlapped portions, sleeves mounted on each branch of the frame and provided with draft-cushioning pads, trace hooks mounted on the frame to swing against the pads, respectively, an upwardly closed hinged member protecting said overlapped portions, and a pliable tube telescoping and connecting above the members of said frame.

In testimony whereof I hereunto affix my signature.

JOHN L. THOMPSON.

Copies of this patent may be obtained for five cents each, by addressing the "Commissioner of Patents, Washington, D. C."